(12) United States Patent
Sammon

(10) Patent No.: US 9,179,002 B2
(45) Date of Patent: Nov. 3, 2015

(54) SYSTEM AND METHOD FOR INITIATING ONLINE SOCIAL INTERACTIONS BASED ON CONFERENCE CALL PARTICIPATION

(75) Inventor: Michael J. Sammon, Watchung, NJ (US)

(73) Assignee: Avaya Inc., Basking Ridge, NJ (US)

( * ) Notice: Subject to any disclaimer, the term of this patent is extended or adjusted under 35 U.S.C. 154(b) by 262 days.

(21) Appl. No.: 13/205,353

(22) Filed: Aug. 8, 2011

(65) Prior Publication Data

US 2013/0041947 A1 Feb. 14, 2013

(51) Int. Cl.
| | |
|---|---|
| G06F 15/16 | (2006.01) |
| H04M 3/56 | (2006.01) |
| H04L 12/18 | (2006.01) |
| H04M 7/00 | (2006.01) |
| H04L 12/58 | (2006.01) |

(52) U.S. Cl.
CPC .......... *H04M 3/563* (2013.01); *H04L 12/1822* (2013.01); *H04M 7/0024* (2013.01); *H04L 12/588* (2013.01); *H04M 2203/655* (2013.01)

(58) Field of Classification Search
CPC ............... H04M 3/568; H04M 2203/5081; H04L 12/1822; H04L 12/588
USPC ......................................................... 709/204
See application file for complete search history.

(56) References Cited

U.S. PATENT DOCUMENTS

| | | | |
|---|---|---|---|
| 7,570,752 B2 | 8/2009 | Jachner | |
| 8,265,992 B1* | 9/2012 | Seshadri et al. | 705/14.19 |
| 2006/0293025 A1* | 12/2006 | Chiou et al. | 455/405 |
| 2007/0172043 A1* | 7/2007 | Keller | 379/202.01 |
| 2009/0044132 A1* | 2/2009 | Combel et al. | 715/753 |
| 2010/0094630 A1 | 4/2010 | Yoakum | |
| 2011/0270922 A1* | 11/2011 | Jones et al. | 709/204 |
| 2011/0283203 A1* | 11/2011 | Periyannan et al. | 715/753 |
| 2012/0123779 A1* | 5/2012 | Pratt et al. | 704/235 |

\* cited by examiner

*Primary Examiner* — Phuoc Nguyen

(57) ABSTRACT

Disclosed herein are systems, computer-implemented methods, and tangible computer-readable storage media for automatically initiating online social interactions based on participation in a conference call. Audio of the conference call is analyzed for data, such as timestamps indicating when people spoke, the volume of speech, words per minute, and emotional context. This analysis determines relationships between participants, and initiates online social interactions compatible with those relationships. This initialization can take the form of a prompt, or can be performed without interruption to the participants.

20 Claims, 5 Drawing Sheets

SYSTEM AND METHOD FOR INITIATING ONLINE SOCIAL INTERACTIONS BASED ON CONFERENCE CALL PARTICIPATION

BACKGROUND

1. Technical Field

The present disclosure relates to initiating online social interactions based on conference call participation and more specifically to creating online social invitations based on the interactions and relationships developed during a conference call.

2. Introduction

Conference call participation is a useful tool for communicating with others and rapidly sharing ideas. Too often, however, the relationships and communication opportunities created by conference calls end with the conference call. Modern online communications tools, such as blogs, microblogs, and social networks, allow relationships and communication opportunities to persist while providing additional opportunities to build relationships, communicate, and increase the overall efficacy of users. Despite the fact that these modern communication tools exist and can aid users to continue communicating, conference call participants rarely use these tools to continue interacting with other participants.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, computer-implemented methods, and tangible computer-readable storage media for initiating online social interactions based on conference call participation. A conference call audio analysis determines the relationships between the participants. Based on those relationships, the conference call participants receive invitations to interact online with other participants. Generally, this invitation for online social interaction takes the form of an invitation to follow another participant's blog, microblog, or social networking forum.

In one aspect, conference call participants can learn of opportunities to interact online without spending time searching for the other participants online in various social media. In another aspect, the initialization can occur without the need for human guidance, operating under system settings.

In certain embodiments, determining the relationships of conference call participants and initiating online social interactions takes place in a substantively simultaneous format, using an audio stream from the conference call to analyze relationships as the call progresses. In such embodiments, the invitations to continue interacting via online mediums can be sent during the conference call, or alternatively, after the call ends. In other embodiments the analysis of the relationships occurs after the conference call based on an audio recording. In either instance, the system analyzes the relationships of the participants to one another, determines the most effective way for participants to continue their relationship, and invites those participants to interact online based on that analysis.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
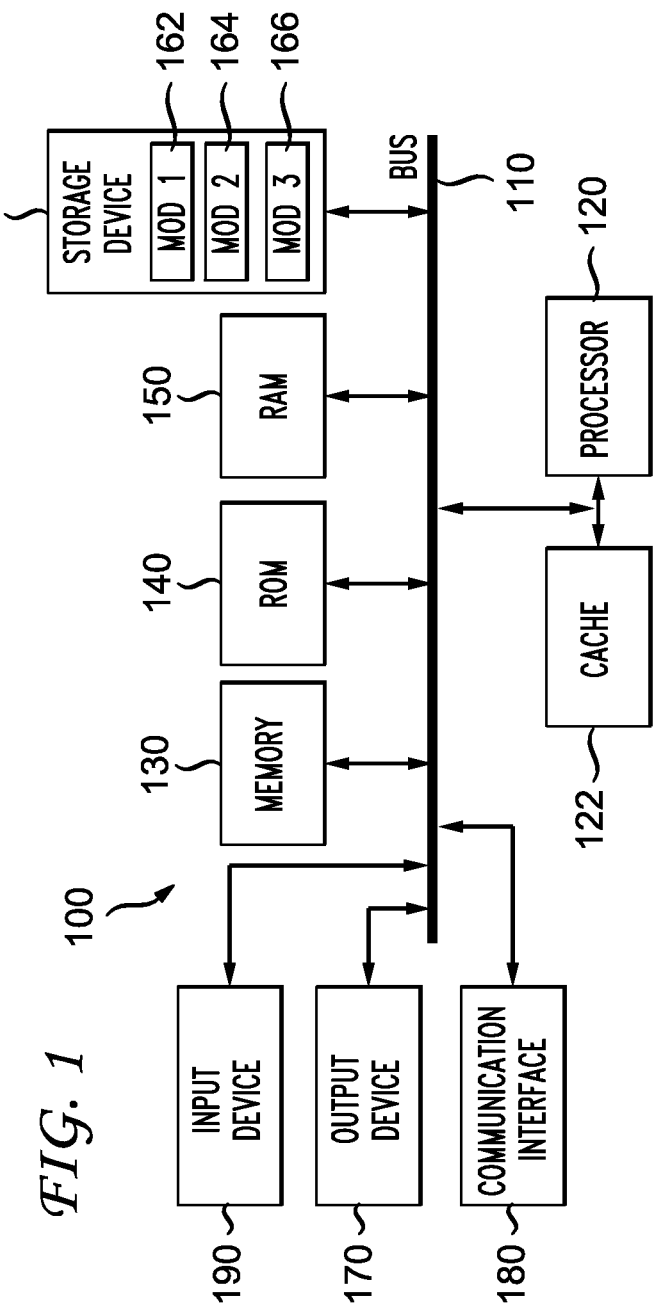
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memo (ROM) 140, a cable or wireless signal containing a bit stream and the like, may also be used in the exemplary operating environment. A computer-readable storage medium or device expressly excludes transitory signals per se and transitory mediums such as wires, cables, fiber optics, infrared medium, and the like. A computer-readable storage medium or device expressly excludes transitory media such as wires, cables, fiber optics, infrared medium, energy, carrier signals, electromagnetic waves, signals per se, and the like.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having discussed some basic computing components, the disclosure returns to a discussion of triggering social network interactions based on communications. A computer system similar to the system 100 shown in FIG. 1 can be configured to initiate online social interactions based on a conference call. In one embodiment, the computer system receives audio from a conference call, analyzes the call to determine the relationships between participants, and initiates online social interactions based on the relationships determined in the conference call.

The audio received by the system 100 can be a live audio stream, a slightly time-delayed audio stream, and/or an audio recording. With a live or substantially live audio stream, the system 100 can perform the analysis to determine the relationships in near-real time and trigger social network actions and/or suggestions during the audio stream. Alternatively, the system 100 can buffer or otherwise save the audio stream and postpone the analysis. Possible reasons for postponing the analysis could be system resources, desire to cross-reference with yet to be obtained information, or lack of information regarding the participant's identities. The system 100 can also receive a recorded audio stream from a separate recording mechanism.

Knowledge of the participants' identities becomes critical in moving from the analysis of the audio to the initiation of online social interactions. In one embodiment, the system 100 has knowledge of the identities of all participants upon receiving the audio. The system can associate each participant with a social networking account or address, for example. This concept can also extend to non-participants who are discussed or otherwise represented in a conference call. For example, if a senior vice president of a company is on the conference call, the senior vice president's comments and participation in the conference call can trigger social network interactions with the senior vice president and/or with the company. The company's presence on social media can be an official Twitter account or a Facebook group page, for example.

When the system receives audio without knowing the identity or social networking accounts of at least one of the participants, the system can proceed with the analysis of the relationships, but will postpone initialization of online social interactions until the system is able to identify the necessary parties. A user can manually identify unknown participants, or an identity guessing module can perform an analysis and/or comparison to other known identities to determine if they are a sufficient match. In one example, the system suggests an identity for unknown participants, and a user can accept or reject the suggestions. For example, if the system 100 knows the identity of two of three conference call participants, the system 100 can proceed with the analysis of the relationships between all three participants. Based on these relationships the system 100 can initiate online social interactions between the two known participants, but postpones interactions between either of the two known participants and the unknown conference call participant until that unknown participant is identified. Because the analysis has already occurred, upon receiving that identification information the system 100 is immediately able to initiate the remaining online social interactions determined by the analysis.

The system analyzes the audio to determine what type of relationship, and subsequently what type of online social interaction, to initiate. The analysis can incorporate quantifiable data from the audio to determine these relationships. Examples of quantifiable data include timestamps of when each participant spoke, how long each participant spoke for, the volume and speed of their speech, timing of speech exchanges between two or more participants, a frequency of interaction with a particular participant, externally available information describing the participants (such as a company organizational hierarchy or a set of data from a social network), and/or an emotional analysis. The analysis can cross-reference other data sources. Examples of other data sources include sidebar communications such as instant messenger, email, or calendaring communications. Another source of information can be pre-existing online social interactions, such as a list of contacts or friends or tags of individuals in a social network. Using this data, the audio analysis classifies the relationships between participants. Examples of the types of relationships recognizable by the system include colleagues, speaker-listener, friends, family, partners, principal-agent, and employer-employee.

Once a relationship is classified, the system 100 determines what type of online social interaction, if any, is appropriate for that relationship, and can determine if that relationship meets a sufficient threshold to merit initialization of the appropriate online social interaction. In considering the type of online social interaction most appropriate for the relationship, certain types of online social interaction fit particular types of relationships and particular types of users better than others. For instance, familial relationships determined from a conference call generally fit social networking interactions, such as personal blogs or Facebook®, whereas professional colleagues may feel uncomfortable or awkward with that form of social interaction. Likewise, professional colleagues may feel very comfortable interacting with another via professional blogs, microblogs, or LinkedIn® accounts. Similarly, the type and amount of social interaction can be based on the respective user identities. For instance, if one of the users is a senior citizen who is only marginally comfortable on Facebook and has never even heard of Twitter, the system can refrain from making suggestions for Twitter or other social networking services that are unfamiliar to the senior citizen.

The system 100 can consider whether or not the relationship meets a threshold value. For example, if a conference call was 5 minutes long with only 1 primary speaker, the relationship strength and depth varies significantly from a 2 hour long conference call where two or more participants had multiple back-and-forth exchanges. While the system 100 can, in either instance, encourage or initialize online social interactions such as following a professional microblog, generally the latter experience would more likely prompt the system 100 to initialize an exchange of professional contact information such as LinkedIn®. The user of a system 100 can establish and modify various settings and thresholds to determine when, how, and with whom the system 100 initializes such interactions on the user's behalf and, in certain instances, when to accept those invitations to interact. The settings can allow the system to automatically approve or accept suggestions, or the user can manually approve the suggestions by clicking on a button or a link.

The system 100 can initiate online social interactions in a variety of ways. The system 100 can send out an invitation to a single individual or to a group to begin interacting. In other instances, the system can add the blog or microblog to a list of blogs and microblogs the user currently follows, without the need for user approval or interaction. If the system 100 initiates online social interactions during a live conference call, a request can come in the form of an audio prompt, either to an individual or to the entire group, or as an email. If the system 100 initiates the online social interactions and needs no approval, the notice can be an audio ping in the conference, possibly sent only to the individuals invited to participate in the online social interaction, or via some other device indicating that initiation of an online social interaction began.

Figure 2:
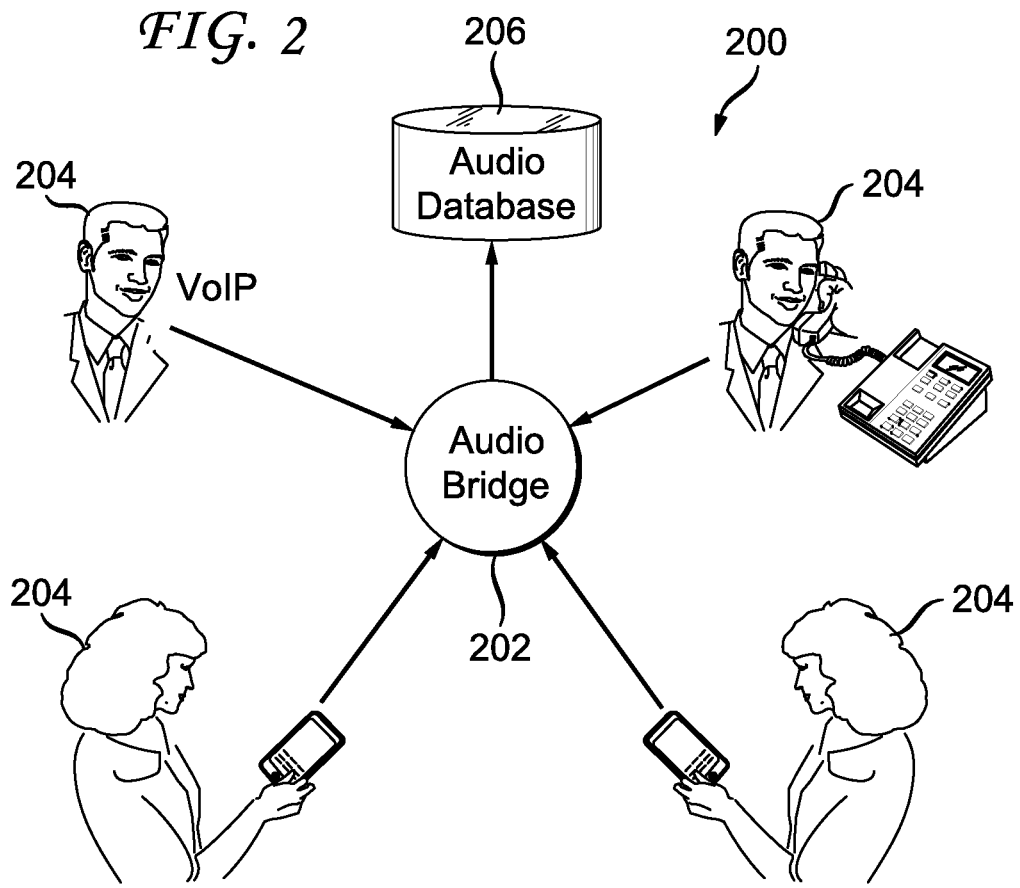
FIG. 2 illustrates an exemplary conference call.

FIG. 2 illustrates an exemplary conference call 200 with the audio recorded. The conference call participants 204 have all called into an audio bridge 202. These participants 204 can use standard telephones, cell phones, VOIP, or any other communication means for connecting to a conference call. In this example, the audio bridge 202 sends the audio from the conference call to an audio database 206, storing the audio for later use by the system 100 in audio analysis. In other embodiments, the audio bridge 202 sends the conference call audio directly to the system 100 for analysis, without the intermediate step of storing the audio in a database.

Figure 3:
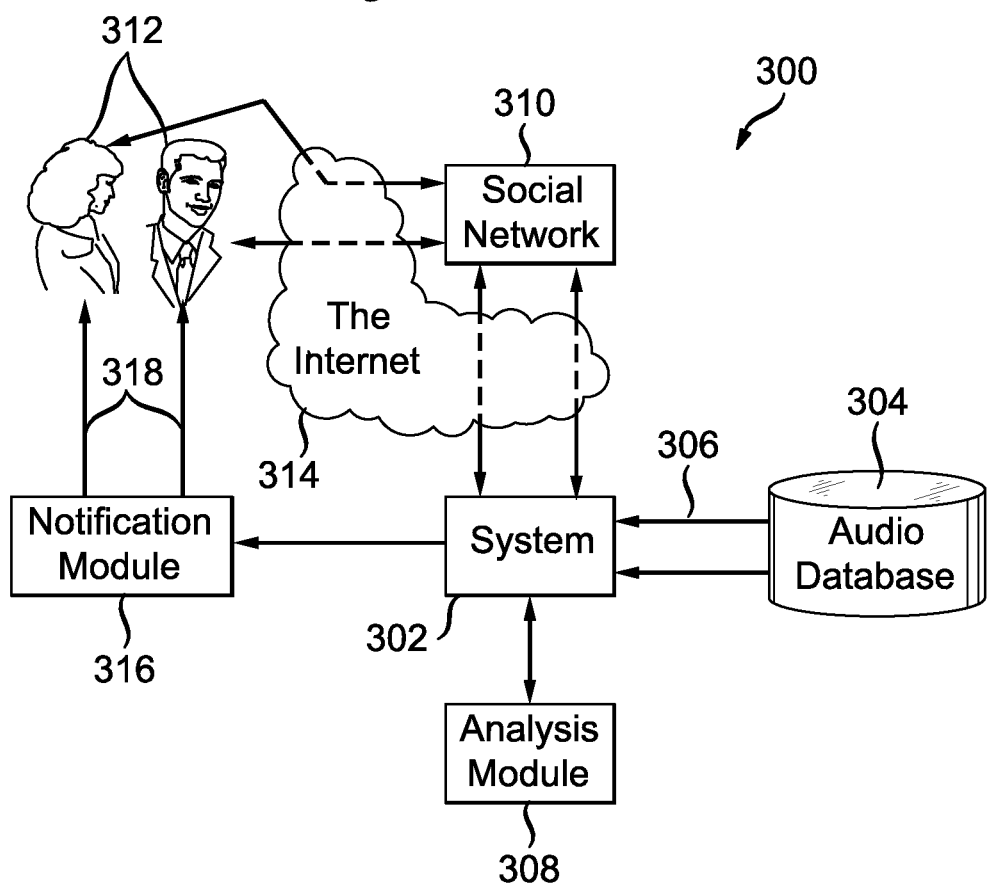
FIG. 3 illustrates an exemplary system configured to initiate online social interactions.

FIG. 3 illustrates an exemplary architecture 300 featuring a system 302 configured to initiate online social interactions. Here the system 302 has access to an audio database 304, which transmits one or more audio recordings 306 to the system 302. While most circumstances necessitate only a single audio recording 306, the system 302 can use multiple audio recordings to help define or refine relationships. The system 302 then corresponds with an analysis module 308 to determine the relationships which exist between the conference call participants. The system 302 can forward the audio to the analysis module 308 and/or send the analysis module 308 quantifiable data from the audio recording 306. For example, the system 302 can forward the timestamp information on to the analysis module 308, after which the analysis module replies with the relationships determined from that information. In one embodiment, the analysis module 308 also determines what relationships meet defined thresholds for initiation of online social interaction. In other embodiments, the system 302 and/or the notification module 316 determine this aspect. While the discussion here is focused on an audio database 304, the system 302 can use other suitable databases for different communications. For example, a conference call generates an audio database, while a video conference generates a video and an audio stream, and a joint desktop sharing and phone conference generates data for multiple modalities. The same analysis to determine relationships can be adapted to different communication modalities and the respective data generated by those communication modalities.

Once the system 302 determines the types of online social interactions for each relationship, the system 302 initiates the online social interaction. Here, the system 302 corresponds through the Internet 314 with the social network 310 with which the conference call participants 312 are registered or through which the online social interaction is to occur. In certain instances, the system 302 checks to see if online social interaction between the two users pre-exists, and if so, can modify the preferred online interaction format. Alternatively, if the system 302 determines from the social network 310 that the users are already interacting on the social network 310, the system 302 can halt the process of generating a suggestion for an online social interaction or suggest a modification or enhancement to the existing interactions. If the system 302 does initiate an online social interaction, the notification module 316 can send notification 318 to the participants 312 that initiation of online social interaction occurred. In some cases, the participants 312 may then need to correspond with the social network 310 to verify the action initiated by the system 302. In addition to or as a replacement for these notifications, the system 302 can communicate directly with the social network 310, such as via an application programming interface (API), to establish the action. Then the social network 310 can notify the call participants 312 through its usual communication channels with the call participants 312.

Figure 4:
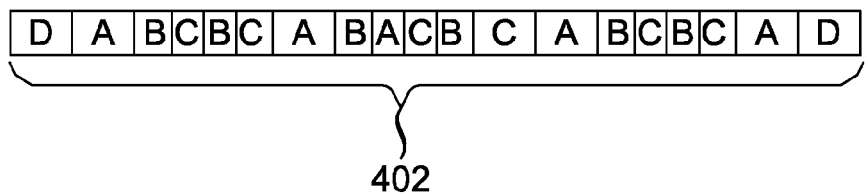
FIG. 4 illustrates an exemplary audio stream associated with a conference call.

FIG. 4 illustrates an exemplary audio stream or recording associated with a conference call. FIG. 4 is used to show how the system can analyze the audio content of a conference call. In this example, the audio stream contains segments 402, and each segment identifies the speaker of that segment, A, B, C, or D. Audio streams or recordings can also have timestamps, identifying when someone began or stopped speaking, or information concerning the volume, emotion, word rate, or other quantifiable data associated with the audio. As shown in FIG. 4, speakers B and C alternate speaking quite frequently, perhaps indicating an intense dialog or collegial banter between B and C. Based on this observation and an optional analysis of the content of their speech, the system can recommend or initiate one type of social interaction between B and C. Further as shown in FIG. 4, speaker A often speaks for slightly longer and when speaker A starts, a short dialog between other users typically ensues. This pattern can indicate that speaker A is a leader or a moderator of the conference call or is guiding the discussion. Based on this observation, the system can recommend or initiate a different type of social interaction between A and a subset of participants up to and including all of the other participants. The system can trigger social interactions based on these or other patterns or templates in the audio.

Figure 5:
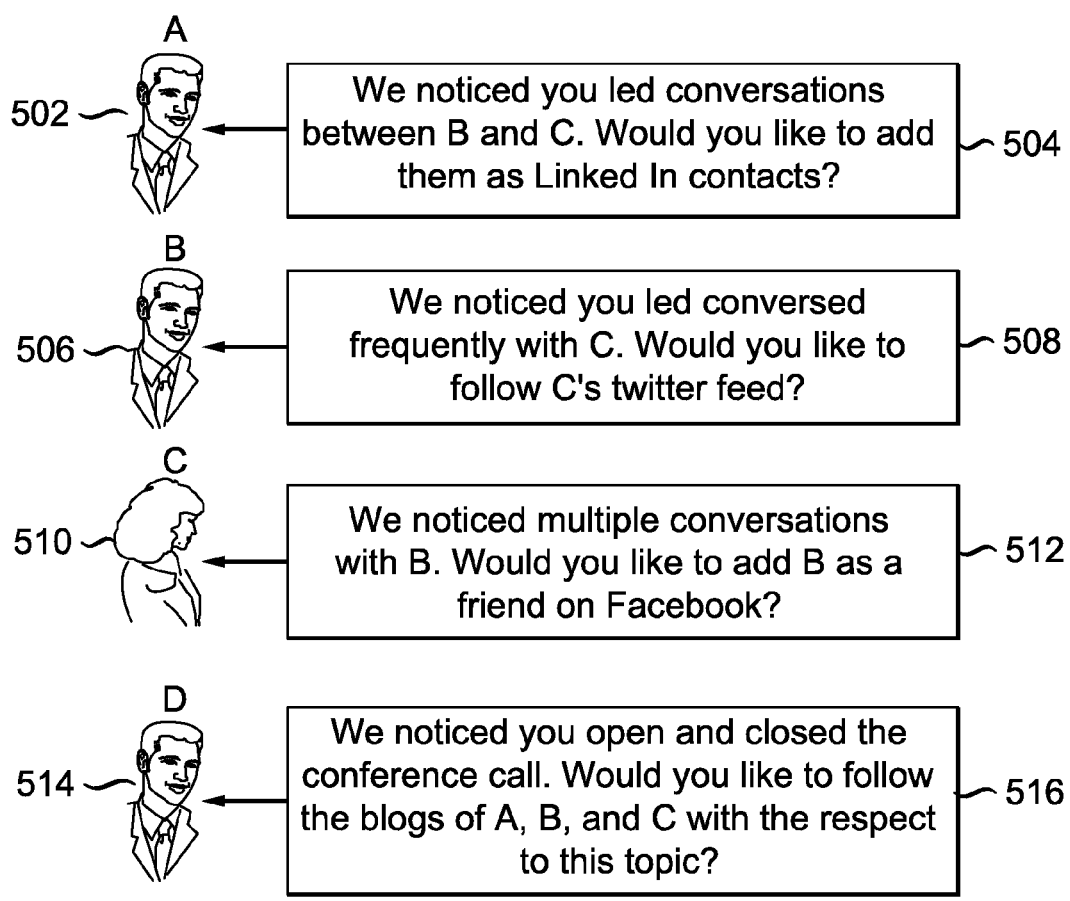
FIG. 5 illustrates an example of individuals receiving prompts for online social interaction.

FIG. 5 illustrates an example of conference call participants receiving prompts for online social interaction. The audio data 402 shown in FIG. 4 is the basis for determining the relationships and the subsequent prompts delivered in FIG. 5. In this example, the participants 502, 506, 510, and 514 each receive a prompt from the system 100 asking if they would like to engage in a form of online social interaction. Initiation of online social interaction can, in certain embodiments, take the form of prompts or invitations. In certain other embodiments, the system 100 can automatically create online social interactions, thereby initiating and creating the online relationship without need for confirmation. When initiating via prompts, the prompts can contain information about the type of relationship analyzed and why the particular form of online social interaction was initiated.

In FIG. 5, participant A 502 receives a prompt 504 asking if he would like to add fellow participants B and C as contacts in LinkedIn®. The prompt 504 can include a reason why the system 100 determined that LinkedIn® was an appropriate form of online social interaction. Here the prompt notes multiple interactions with other participants. Participant B 506 was noted conversing frequently with participant C 510, and receives a prompt 508 asking if they desire to follow C's Twitter® feed. Similarly, participant C 510 receives a prompt 512 asking if they would like to add B 506 as a friend on Facebook®. Participant D 514 receives a prompt 516 noting that they opened and closed the conference call, and asking if D 514 would like to follow the blogs of the other participants with regard to this topic. The system can suggest following an entire blog of another user or a specific subset of posts on the blog. For example, the system can suggest following only blog posts with a specific keyword or tag, or all blog posts within a specified time period.

The prompt 516 to participant D 514 illustrates that the system 100 can initiate multiple online social interactions for a single party. While the online social interactions included in the prompt 516 to D 514 were all for blogs, they could have been to multiple and varied forms of social interaction. In the case of more complex prompts, the user can accept the entire prompt, or can approve or reject individual portions of the prompt. The prompts 508, 512 to B 506 and C 510 illustrate that while two participants can have relatively similar conversations and undergo a similar analysis, the form of online social interaction can vary. With B 506 and C 510, exemplary reasons why they had differing prompts could be that C 510 already follows B 506 on Twitter®, or perhaps B 506 had instructed his system not to initiate Facebook® interactions. In determining which form of online social interaction to initiate, the system 100 can check which online social interactions already exist, which are preferred or disliked by the participant, and which best fit the relationship.

As illustrated in the prompt 516 to D 514, the system 100 can also use filtering to only receive specific social interactions related to a desired topic or theme. This helps participants who, for example, desire to interact with someone only in a specific form or with regard to a specific topic. For instance, should a system 100 initiate the following of a Twitter® or similar microblog account of a conference call participant Z, a professional colleague probably does not want to know every time Z updates that account by going to the grocery store. The professional colleague may only want to know about a specific topic or theme, and the system 100 can filter out remaining topics. The system can perform this filtering using tags, metadata, word searches, or using other filtering methods.

Figure 6:
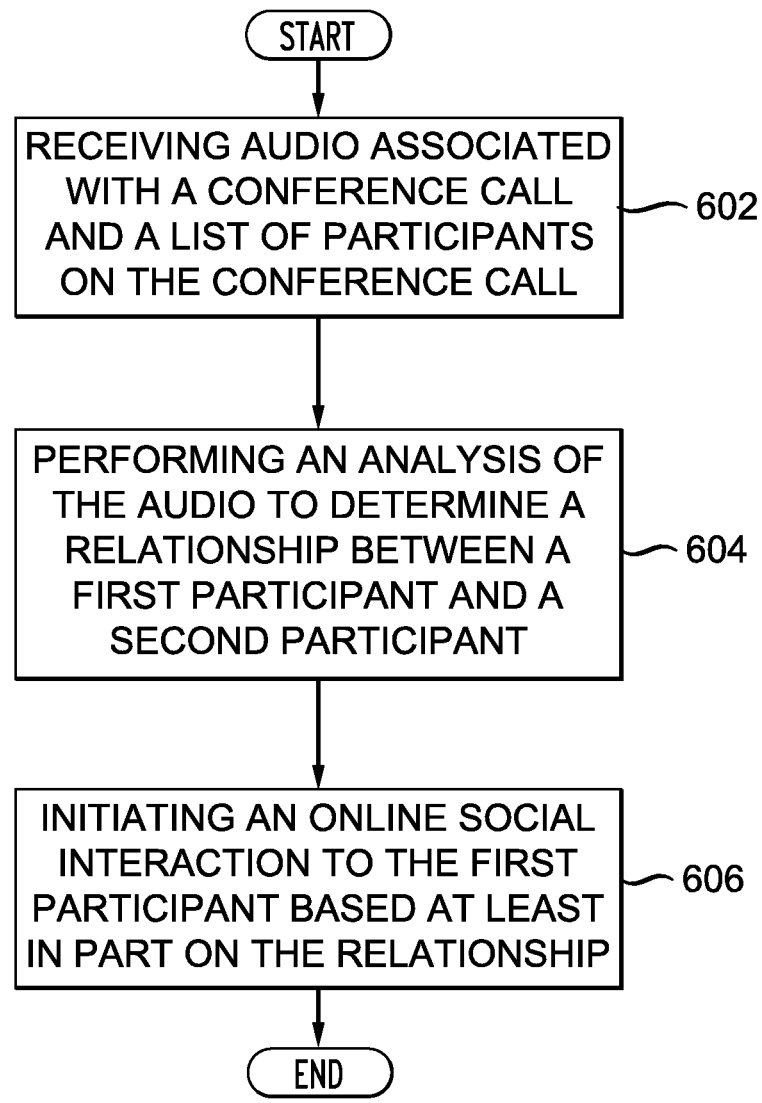
FIG. 6 illustrates an exemplary method claim.

FIG. 6 illustrates an exemplary method embodiment for initiating online social interactions based on conference call participation. For the sake of clarity, the method is discussed in terms of an exemplary system such as the system shown in FIG. 1 configured to practice the method. The system 100 receives audio associated with a conference call and a list of participants on the conference call (602). The system can receive the audio in real time, substantially real time, or as recorded audio. The system can perform the following steps (604), (606) while the conference call is on-going or can perform them after the conference call is over. The conference call can be replaced with virtually any form of communication, in which case, the audio can be replaced with corresponding data for that form of communication.

The system 100 then performs an analysis of the audio to determine a relationship between a first participant and a second participant (604). The relationship between the first participant and the second participant can indicate that a user is a speaker or a questioner. The system can perform the analysis using timestamps, volume, speaking duration, caller phone number, caller ID text, and/or other caller identity information. The system 100 can optionally retrieve data associated with sidebar communications and use that data when performing the analysis. The system can verify that the relationship between the first participant and the second participant meets a threshold value prior to the initiating the online social interaction in step (606).

The system 100 initiates an online social interaction to the first participant based at least in part on the relationship (606). The system can structure the online social interaction to filter content by topic and/or time. The online social interaction can be interactions on a social network, a blog, and a microblog. Some example online social interactions include following someone on Twitter, adding someone as a friend on Facebook, adding someone as a contact on LinkedIn, or a connection in Echoes. The system can initiate the online social interaction via a prompt to one or both users. Upon receiving user acceptance of the prompt, the system can continue to monitor the users' communications in the conference, via the online social interactions, or via other channels for indications to modify the relationship.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to forms of online social interaction not specifically enumerated within the disclosure, and can apply to other types of communications beyond conference calls, such as video conferencing, email, text messages, multi-modal communications, and so forth. Those skilled in the art will readily recognize various modifications and changes that may be made to the principles described herein without following the example embodiments and applications illustrated and described herein, and without departing from the spirit and scope of the disclosure.

We claim:

1. A method comprising:
    analyzing, via a processor, an audio stream associated with a conference call, to yield an analysis;
    based on the analysis, classifying a relationship type between a first participant on the conference call and a second participant on the conference call;
    based on the relationship type, identifying a type of online social interaction to initiate between the first participant and the second participant;
    based on the type of online social interaction, identifying an online social account for initiating the type of online social interaction;
    based on the analysis, determining a relationship strength between the first participant and the second participant; and
    when the relationship strength satisfies a threshold for the relationship type, presenting a prompt to the second participant for initiating an online social interaction between the first participant and the second participant via the online social account.

2. The method of claim 1, wherein the relationship type comprises a speaker and a questioner.

3. The method of claim 1, wherein the online social interaction is filtered based on topic.

4. The method of claim 1, wherein the online social interaction comprises one of a social network, a blog, and a microblog.

5. The method of claim 1, wherein the conference call comprises a third participant, the method further comprising:
    analyzing the audio stream to determine types of relationships among the first participant, the second participant, and the third participant;
    determining relationship strengths between the first participant, the second participant, and the third participant; and
    presenting the prompt when the relationship strengths for the types of relationship also satisfy thresholds for the relationship types.

6. The method of claim 1, wherein the audio stream is analyzed based on one of a timestamp, volume, speaking duration, and a caller identity.

7. The method of claim 1, wherein the online social interaction comprises following an online activity of the first participant via the online social account.

8. The method of claim 1, wherein the online social interaction comprises adding the first participant to an online contact list of the second participant.

9. The method of claim 1, further comprising retrieving data associated with sidebar communications, wherein the relationship type is further based on the data.

10. A system, comprising:
a processor; and
a computer-readable storage device storing instructions which, when executed by the processor, cause the processor to perform operations comprising:
analyzing, via a processor, audio of a conference call, to yield an analysis;
determining, based on the analysis, a relationship type between a first participant on the conference call and a second participant on the conference call;
based on the relationship type, identifying a type of online social interaction to initiate between the first participant and the second participant;
based on the type of online social interaction, identifying an online social account for initiating the type of online social interaction;
based on the analysis, determining a relationship strength between the first participant and the second participant; and
when the relationship strength satisfies a threshold for the relationship type, presenting a prompt to the second participant for initiating an online social interaction between the first participant and the second participant via the online social account.

11. The system of claim 10, wherein the relationship type comprises one of family, friends, colleagues, partners, principal-agent, employer-employee, speaker-listener, and speaker-questioner.

12. The system of claim 10, wherein the online social interaction is filtered based on topic.

13. The system of claim 10, wherein the online social interaction comprises one of a social network, a blog, and a microblog.

14. The system of claim 10, wherein the conference call comprises a third participant, and wherein the computer-readable storage device has additional instructions stored which, when executed by the processor, cause the processor to perform operations comprising:
analyzing the received audio to determine types of relationship among the first participant, the second participant, and the third participant;
determining relationship strengths between the first participant, the second participant, and the third participant; and
presenting the prompt when the relationship strengths for the types of relationship also satisfy thresholds for the relationship types.

15. The system of claim 10, wherein the received audio is analyzed based on one of a timestamp, volume, speaking duration, and a caller identity.

16. A computer-readable device having instructions stored which, when executed by a processor, cause the processor to perform operations comprising:
analyzing, via a processor, audio of a conference call, to yield an analysis;
determining, based on the analysis, a relationship type between a first participant on the conference call and a second participant on the conference call;
based on the relationship type, identifying a type of online social interaction to initiate between the first participant and the second participant;
based on the type of online social interaction, identifying an online social account for initiating the type of online social interaction;
based on the analysis, determining a relationship strength between the first participant and the second participant; and
when the relationship strength satisfies a threshold for the relationship type, presenting a prompt to the second participant for initiating an online social interaction between the first participant and the second participant, via the online social account.

17. The computer-readable device of claim 16, wherein the audio is analyzed based on one of a timestamp, volume, speaking duration, and a caller identity.

18. The computer-readable device of claim 16, wherein the online social interaction comprises following an online activity of the first participant via the online social account.

19. The computer-readable device of claim 16, wherein the online social interaction comprises adding the first participant to an online contact list of the second participant.

20. The computer-readable device of claim 16, having additional instructions stored which, when executed by the processor, cause the processor to perform further operations comprising:
retrieving data associated with sidebar communications, wherein the relationship type is further based on the data.

* * * * *